United States Patent
Mathon et al.

(10) Patent No.: US 9,827,639 B2
(45) Date of Patent: Nov. 28, 2017

(54) METHOD AND SYSTEM FOR ATTACHING A PIECE OF EQUIPMENT TO A STRUCTURE MADE FROM COMPOSITE MATERIAL

(71) Applicant: SNECMA, Paris (FR)

(72) Inventors: Richard Mathon, Brunoy (FR); Antoine Phelippeau, Alforville (FR)

(73) Assignee: SNECMA, Paris (FR)

( * ) Notice: Subject to any disclaimer, the term of this patent is extended or adjusted under 35 U.S.C. 154(b) by 518 days.

(21) Appl. No.: 14/375,570

(22) PCT Filed: Feb. 1, 2013

(86) PCT No.: PCT/FR2013/050210
§ 371 (c)(1),
(2) Date: Jul. 30, 2014

(87) PCT Pub. No.: WO2013/114051
PCT Pub. Date: Aug. 8, 2013

(65) Prior Publication Data
US 2015/0013143 A1 Jan. 15, 2015

Related U.S. Application Data

(60) Provisional application No. 61/594,471, filed on Feb. 3, 2012.

(51) Int. Cl.
*B23P 19/04* (2006.01)
*B29C 70/48* (2006.01)
(Continued)

(52) U.S. Cl.
CPC .............. *B23P 19/04* (2013.01); *B29C 65/56* (2013.01); *B29C 70/48* (2013.01); *B29C 70/68* (2013.01);
(Continued)

(58) Field of Classification Search
CPC ......... B23P 19/04; B29C 65/56; B29C 70/68; B29C 70/885; B29C 70/48;
(Continued)

(56) References Cited

U.S. PATENT DOCUMENTS 4,650,620 A 3/1987 Owen et al.
8,545,662 B2 * 10/2013 Jagos ...................... B29C 70/44
156/245

(Continued)

OTHER PUBLICATIONS

International Search Report issued May 22, 2013, in PCT/FR13/050210 filed Feb. 1, 2013.

*Primary Examiner* — Jacob Cigna
*Assistant Examiner* — Lee A Holly
(74) *Attorney, Agent, or Firm* — Oblon, McClelland, Maier & Neustadt, L.L.P.

(57) ABSTRACT

A method of placing a fastener plate on a structure made of composite material, the structure being obtained by a technique of injecting resin under a vacuum, the technique including placing a fiber preform in a closed mold, injecting a thermosetting resin into the mold, and polymerizing the resin prior to cooling. The method includes mounting a metal fastener plate against a wall of the mold before putting the fiber preform into place, the fastener plate coming into contact with one of faces of the fiber preform while the fiber preform is being put into place in the mold, and the resin becoming deposited between the fastener plate and the fiber preform while the resin is being injected into the mold. The method may be used in particular for fastening equipment on a composite material fan casing of a gas turbine for an aeroengine.

7 Claims, 1 Drawing Sheet

(51) Int. Cl.
*B29C 70/68* (2006.01)
*B29C 70/88* (2006.01)
*B29C 65/56* (2006.01)
B29L 31/00 (2006.01)
B29K 101/10 (2006.01)

(52) U.S. Cl.
CPC ........ *B29C 70/885* (2013.01); *B29K 2101/10* (2013.01); *B29L 2031/7504* (2013.01); *Y10T 29/49963* (2015.01); *Y10T 29/53687* (2015.01)

(58) Field of Classification Search
CPC ....... B29L 2031/7504; Y10T 29/49963; Y10T 29/53687; B29K 2101/10
See application file for complete search history.

(56) References Cited

U.S. PATENT DOCUMENTS

| | | |
|---|---|---|
| 2008/0131656 A1 | 6/2008 | Walker et al. |
| 2011/0174536 A1 | 7/2011 | Wilson et al. |
| 2012/0276362 A1* | 11/2012 | Denavit ................ F16B 11/006 428/223 |

* cited by examiner

METHOD AND SYSTEM FOR ATTACHING A PIECE OF EQUIPMENT TO A STRUCTURE MADE FROM COMPOSITE MATERIAL

BACKGROUND OF THE INVENTION

The present invention relates to the general field of fastening equipment on a composite material structure.

One of the fields of application of the invention is that of composite material fan casings for gas turbines of aeroengines, which casings have various pieces of equipment mounted thereon.

In a gas turbine aeroengine, a fan casing performs several functions. It defines the air inlet passage into the engine, it supports an abradable material facing the tips of the blades of the fan, it supports an optional soundwave absorber structure for performing acoustic treatment at the inlet of the engine, and it incorporates or supports an optional shield for retaining debris.

It has become common practice to fabricate a fan casing out of composite material, in particular by a technique of injecting resin under a vacuum (also referred to as resin transfer molding (RTM)). In that fabrication technique, a fiber preform is wound in superposed layers on a winding mandrel forming an injection mold. Once the mold has been closed, a thermosetting resin is injected into the inside of the mold and then polymerized. The fan casing is unmolded after it has cooled. Reference may be made to document EP 1 961 923, which describes an implementation of such a method.

A fan casing also supports various pieces of equipment, such as for example flanges for holding pipework and supports for accessories (probes, etc.). This equipment is generally mounted against one of the faces of the casing merely by means of fastener screws. Unfortunately, that type of assembly is not strong because of the poor holding power of the threads made in the composite material into which the fastener screws are screwed (in particular compared with tapping made in a metal material). Having recourse to bushings screwed into the fan casing does not enable that problem to be solved, since putting such bushings into place likewise requires holes formed in the composite material to be tapped.

OBJECT AND SUMMARY OF THE INVENTION

A main object of the present invention is thus to mitigate such drawbacks by proposing a method of putting a fastener plate into place on a composite material structure in order to fasten equipment thereto, and presenting considerable holding power.

In accordance with the invention, this object is achieved by a method of placing a fastener plate on a structure made of composite material, the structure being obtained by a technique of injecting resin under a vacuum, the technique comprising placing a fiber preform in a closed mold, injecting a thermosetting resin into the mold, and polymerizing the resin prior to cooling, the method consisting in mounting a metal fastener plate against a wall of the mold before putting the fiber preform into place, the fastener plate coming into contact with one of the faces of the fiber preform while it is being put into place in the mold, and the resin becoming deposited between the fastener plate and the fiber preform while it is being injected into the mold.

With such a method, the precise location of the fastener plate can be ensured by the way it is positioned in the mold. Furthermore, the fastener plate is advantageously adhesively fastened on the composite material structure by using the thermosetting resin that is injected into the mold. As a result, no specific adhesive bonding step is required for fastening the fastener plate to the composite material structure, since the injected resin performs the bonding.

The fastener plate may be mounted against the wall of the mold by means of a holding screw and a clamping wedge. Under such circumstances, the screw holding the fastener plate is preferably withdrawn after the resin has polymerized and before it has cooled. Thus, any risk of the fastener plate remaining attached to the mold can be avoided.

The invention also provides a method of fastening equipment on a structure made of composite material, the method comprising: a step of placing a metal fastener plate against one of the faces of the composite material structure as defined above, said fastener plate presenting a tapped hole; a step of forming a smooth orifice in the composite material structure in alignment with the tapped hole in the fastener plate; a step of applying the equipment for fastening against the face of the composite material structure opposite from the face on which the fastener plate is fastened; and a step of fastening the equipment for fastening on the composite material structure by screwing a screw member through the composite material structure and into the tapped hole in the fastener plate.

With such a fastener method, the composite material structure is sandwiched between the fastener plate on one side and the equipment for fastening on the other. The screw fastening of the equipment thus takes place in a tapped hole that is formed in a metal element, i.e. the fastener plate. This gives much greater holding strength than when screwing directly into the composite material structure.

Preferably, the tapped hole in the fastener plate is formed during the step of drilling the composite material structure. Moreover, the tapped hole of the fastener plate may be the same as a hole for passing a holding screw of the fastener plate against the wall of the mold.

The invention also provides the use of the method as defined above, in fastening equipment on a composite material fan casing of a gas turbine for an aeroengine.

The invention also provides a device for fastening equipment on a composite material structure, the device comprising a metal fastener plate fastened on one of the faces of the composite material structure and presenting at least one tapped hole in alignment with a smooth orifice formed in the composite material structure, and a screw member for passing through the equipment for fastening and the composite material structure and for being screwed into the tapped hole of the fastener plate, the equipment for fastening being applied against the face of the composite material structure that is opposite from the face on which the fastener plate is fastened.

Advantageously, the fastener plate is adhesively fastened on the face of the composite material structure by means of a thermosetting resin used during the fabrication of the composite material structure. Moreover, the tapped hole of the fastener plate may be the same as a hole for passing a holding screw of the fastener plate against the wall of the mold.

BRIEF DESCRIPTION OF THE DRAWINGS

Other characteristics and advantages of the present invention appear from the following description made with reference to the accompanying drawings that show an implementation having no limiting character. In the figures.

DETAILED DESCRIPTION OF THE INVENTION

The invention relates to fastening equipment on a structure that is made of composite material. The invention thus applies to any part that is made of composite material and on which there is a need to fasten equipment.

A preferred but non-exclusive field of application of the invention relates to fastening equipment on a composite material fan casing of a gas turbine for an aeroengine.

A fan casing made of composite material comprises fiber reinforcement (e.g. made of carbon, glass, aramid, or ceramic fibers) that is densified with a polymer matrix (e.g. epoxy, bismaleimide, or polyimide). The casing is generally fabricated by a technique of injecting resin under a vacuum known as RTM.

In known manner, the RTM technique consists in performing three-dimensional weaving to make a fiber texture on a take-off drum. The fiber texture is then wound in superposed layers on a mandrel of an injection mold, the mandrel presenting a profile that corresponds to the profile of the casing that is to be made. The injection mold is closed by applying a countermold on the preform, and a thermosetting resin is injected at low pressure into the inside of the mold. After a polymerization step, a fiber blank is obtained that is cooled prior to being unmolded and machined to the final shape of the desired casing.

Figure 1:
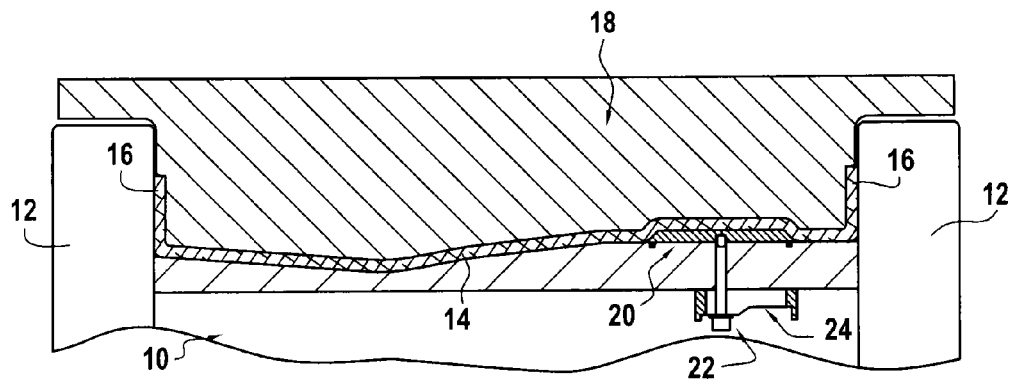
FIG. 1 shows a step of the fastening method in accordance with the invention applied to fabricating a fan casing by the RTM method.

FIG. 1 shows a portion of a mandrel 10 of the injection mold used during the RTM technique as described briefly above for fabricating a fan casing out of composite material. The mandrel 10 presents an outside surface of profile that corresponds to the profile of the casing that is to be fabricated, together with two end plates 12.

A fiber preform 14 has been wound on the mandrel so as to fit closely to its profile, and its end portions 16 are raised to bear against the end plates 12 so as to form preform portions that correspond to flanges of the casing that is to be fabricated. The fiber preform is thus held in position by applying a countermold 18.

According to the invention, prior to putting the fiber preform 14 into place on the mandrel 10, provision is made to mount a metal fastener plate 20 against a wall of the mold, this plate serving subsequently to fasten equipment to the casing after it has been fabricated.

Figure 2:
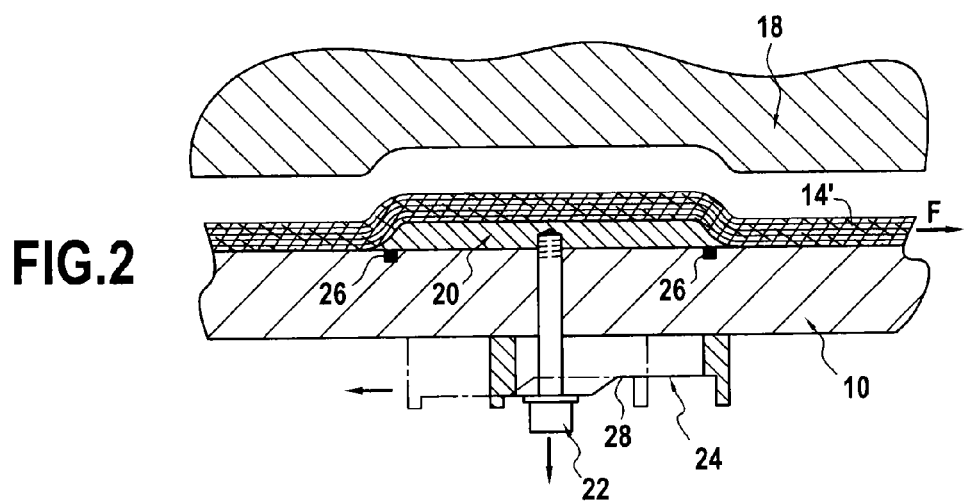
FIG. 2 shows another step of the fastening method shown in FIG. 1.

More precisely, in the embodiment of FIGS. 1 and 2, the fastener plate 20 is mounted on the outside surface of the mandrel 10 prior to winding the fiber texture thereon.

The fastener plate 20 is made of a metal material, e.g. of aluminum, of steel, etc. It is mounted on the outside surface of the mandrel by means of a holding screw 22 that passes through the mandrel from the inside, and by means of a clamping wedge 24 for blocking the fastener plate in position when mounted in this way.

Sealing gaskets 26 are positioned on the mandrel at each longitudinal end of fastener plate in order to prevent any resin from infiltrating between the outside surface of the mandrel and the inside surface of the fastener plate during the resin injection step of the RTM technique.

Once the fastener plate 20 has been mounted on the outside surface of the mandrel, the fiber texture can be wound in a plurality of superposed layers on the mandrel.

The injection mold is closed by the countermold 18 and the thermosetting resin is then injected at low pressure. The resin becomes deposited in particular between the outside surface of the fastener plate 20 and the inside surface of the fiber preform 14. The polymerization step serves in particular to harden the resin that has been deposited in this location, the resin then acting as adhesive between the fastener plate and the fiber blank that is obtained at the end of this step. Thus, the fastener plate is fastened to the fiber blank without any need to use a special adhesive.

The screw 22 for holding the fastener plate 20 is preferably removed from the injection mold before the cooling step of the RTM technique. For this purpose, once the polymerization step has been performed, and before the cooling step, the operator loosens the holding screw by one-fourth of a turn and moves the clamping wedge 24 (with a mallet) so as to bring its step 28 level with the holding screw (chain-dotted lines in FIG. 2). It is then possible to release the holding screw completely.

Once the cooling step of the RTM technique has been performed, the injection mold is opened (the countermold 18 is removed—see FIG. 2) and the fiber blank 14' for the casing is unmolded, e.g. in the direction of arrow F in FIG. 2.

Figure 3:
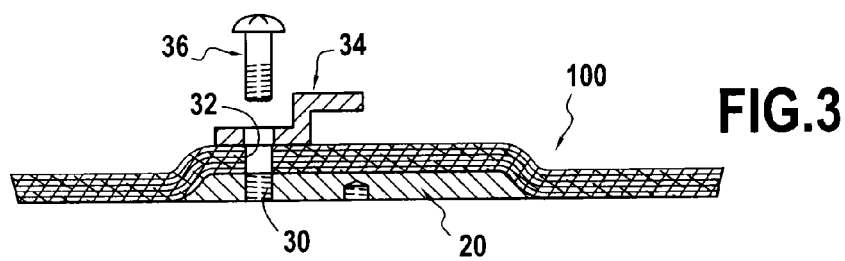
FIG. 3 shows the fastener device obtained at the end of the method of FIGS. 1 and 2.

After machining for finishing purposes, the casing 100 of the desired composite material is obtained with a metal fastener plate 20 adhesively bonded to its inside face (FIG. 3). Using an appropriate drilling tool, a tapped hole 30 is formed through the fastener plate, and likewise a smooth hole 32 is formed through the casing, this smooth hole being in alignment with the tapped hole in the fastener plate.

It should be noted that this tapped hole 30 of the fastener plate 20 may be the same as the hole previously formed for passing the holding screw 22 of the fastener plate against the against the wall of the mold.

In accordance with the fastening method of the invention, equipment 34 can then be fastened on the casing 100 beside its outside face, using a fastener screw 36 that passes through the casing and that is screwed into the tapped hole 30 in the fastener plate.

Figure 4:
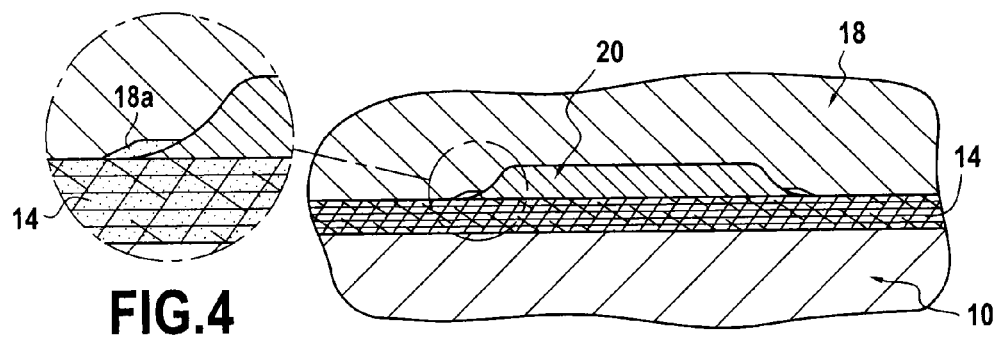
FIG. 4 shows a variant implementation of the fastening method in accordance with the invention.

FIG. 4 shows a variant embodiment, showing how the equipment may be fastened on the inside face of the fan casing.

In this variant, the fastener plate 20 needs to be mounted on the outside face of the casing. For this purpose, prior to putting the fiber preform 14 into place on the mandrel 10, the fastener plate 20 is mounted against the inside surface of the countermold 18, either by means of a holding screw passing through the countermold from the outside (possibly with the help of a clamping wedge as shown in FIGS. 1 and 2), or else by means of a temporary adhesive (e.g. comprising a tackifying agent).

Furthermore, a recess 18a may be created in the countermold around the fastener plate. During the resin-injection step, this recess serves to form a bead of pure resin around the fastener plate in order to reinforce its attachment on the casing.

Once the fastener plate 20 has been mounted on the inside surface of the countermold, the fiber texture can be wound as a plurality of superposed layers on the mandrel, and the RTM technique can continue in the same manner as in the previously-described implementation.

The invention claimed is:

1. A method of placing a metal fastener plate on a structure made of composite material, the structure obtained by a technique of injecting resin under a vacuum, the technique including placing a fiber preform in a closed mold, injecting a thermosetting resin into the mold, and polymerizing the resin prior to cooling, the method comprising:
   mounting the metal fastener plate against a wall of the mold before putting the fiber preform into place, the fiber preform having a first face facing said wall of the mold and a second face opposite to the first face;
   placing the metal fastener plate into contact with the first face of the fiber preform while the fiber preform is being put into place in the mold such that the metal fastener plate is located between said wall of the mold and said first face of the fiber preform; and
   depositing the resin between the fastener plate and the fiber preform while the resin is being injected into the mold.

2. A method according to claim 1, wherein the metal fastener plate is mounted against the wall of the mold by a holding screw and a clamping wedge.

3. A method according to claim 2, wherein the screw holding the metal fastener plate is withdrawn after the resin has polymerized and before the resin has cooled.

4. A method of fastening equipment on a structure made of composite material, the method comprising:
   placing the metal fastener plate against one of the faces of the composite material structure according to claim 1, the metal fastener plate presenting a tapped hole;
   forming an orifice in the composite material structure in alignment with the tapped hole in the metal fastener plate;
   applying the equipment for fastening against the face of the composite material structure opposite from the face on which the metal fastener plate is fastened; and
   fastening the equipment for fastening on the composite material structure by screwing a screw member through the composite material structure and into the tapped hole in the metal fastener plate.

5. A method according to claim 4, wherein the tapped hole in the metal fastener plate is formed during a drilling of the composite material structure.

6. A method according to claim 4, wherein the tapped hole of the metal fastener plate is a same as a hole for passing a holding screw of the metal fastener plate against the wall of the mold.

7. A method according to claim 4, wherein the composite material structure is a fan casing of a gas turbine for an aeroengine.

* * * * *